(12) United States Patent
Bhargava et al.

(10) Patent No.: US 11,748,667 B2
(45) Date of Patent: Sep. 5, 2023

(54) METHODS AND SYSTEMS FOR THE MEASUREMENT OF RELATIVE TRUSTWORTHINESS FOR TECHNOLOGY ENHANCED WITH AI LEARNING ALGORITHMS

(71) Applicant: NuEnergy.ai, Ottawa (CA)

(72) Inventors: Niraj Bhargava, Ottawa (CA); Fred Speckeen, Kitchener (CA); Evan W. Steeg, Kingston (CA); Jorge Deligiannis, Ottawa (CA); Gaston Gonnet, Waterloo (CA)

(73) Assignee: NuEnergy.ai, Ottawa (CA)

( * ) Notice: Subject to any disclaimer, the term of this patent is extended or adjusted under 35 U.S.C. 154(b) by 971 days.

(21) Appl. No.: 16/454,613

(22) Filed: Jun. 27, 2019

(65) Prior Publication Data

US 2020/0005168 A1 Jan. 2, 2020

Related U.S. Application Data

(60) Provisional application No. 62/690,519, filed on Jun. 27, 2018.

(51) Int. Cl.
*G06Q 30/00* (2023.01)
*G06N 20/20* (2019.01)
*G06N 5/04* (2023.01)
*G06F 17/18* (2006.01)
*G06N 20/00* (2019.01)
*G06F 18/22* (2023.01)

(52) U.S. Cl.
CPC .............. *G06N 20/20* (2019.01); *G06F 17/18* (2013.01); *G06F 18/22* (2023.01); *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2002/0087416 A1* | 7/2002 | Knutson | G06Q 30/02 705/23 |
| 2005/0177371 A1* | 8/2005 | Yacoub | G10L 15/32 704/270.1 |
| 2005/0198248 A1* | 9/2005 | Morimoto | G06F 30/18 709/223 |
| 2019/0362645 A1* | 11/2019 | Miller | G06N 5/041 |

* cited by examiner

*Primary Examiner* — Matthew T Sittner
(74) *Attorney, Agent, or Firm* — Gowling WLG (Canada) LLP

(57) ABSTRACT

The present disclosure provides a system and method for use in evaluating the trustworthiness of an artificial intelligence (AI) process. The trustworthiness evaluation may include both automated and manual evaluation of the AI process. Further, the system is provided with functionality for automatically evaluating and modifying the criteria used in evaluating the AI process.

17 Claims, 6 Drawing Sheets

METHODS AND SYSTEMS FOR THE MEASUREMENT OF RELATIVE TRUSTWORTHINESS FOR TECHNOLOGY ENHANCED WITH AI LEARNING ALGORITHMS

RELATED APPLICATIONS

The current application claims priority to U.S. Provisional Application 62/690,519, filed Jun. 27, 2018, the entire content of which are incorporated by reference in their entirety for all purposes.

TECHNICAL FIELD

The present disclosure relates to artificial intelligence (AI) and machine learning (ML) and in particular to assessing and measuring the trustworthiness of the AI/ML.

BACKGROUND

AI systems are information systems that appear to act intelligently, that perform or mimic certain tasks that previously were performed only by humans or other living systems—for example vision and object recognition; speech recognition and natural language processing; deductive reasoning and inductive inference; diagnosis (of disease or of problems in mechanical systems); time series forecasting (as in financial trading); and so forth. Many AI systems contain or make use of a "trained model", that is, a computational structure that performs classification, regression or prediction tasks and which is built through the use of input data (e.g., training data, testing data, validation data) and the techniques of machine learning (including unsupervised, semi-supervised, supervised and reinforcement learning methods).

After previous waves of excitement and investment followed by real and perceived failures and "AI winters", AI is again on an upswing. Significant investments are being made by private (angel, VC, PE, corporate) and governmental entities, and AI, ML and Data Science courses are popular worldwide.

Drivers of this recent growth include faster hardware (such as GPUs), more and larger training datasets (due to cloud storage, abundant sensors, social media), and improved algorithms and tools (including "Deep Learning" methods and available code libraries like TensorFlow).

Yet growth, profitability and potential socioeconomic benefits of AI are threatened by challenges of "social license", especially regulation and public perception concerning privacy, security, reliability, transparency and the ethical issues around job loss and about machines making decisions or performing tasks previously made by our fellow human beings.

Ironically, the abundance and easy online availability of data, algorithms, code and tools may be exacerbating concerns around reliability and trust. This is because developers may incorporate code or methods of questionable accuracy, security and transparency—especially as some popular code repositories are updated frequently and with no or minimal security checks on who updates and what is in the updates; and end-users may then download or purchase and install and use the resulting systems without adequate knowledge of the code's provenance, inner functioning, potential bias, "extreme case" behavior or other risks.

Accordingly, systems and methods that enable the measurement of relative trustworthiness of AI remains highly desirable.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
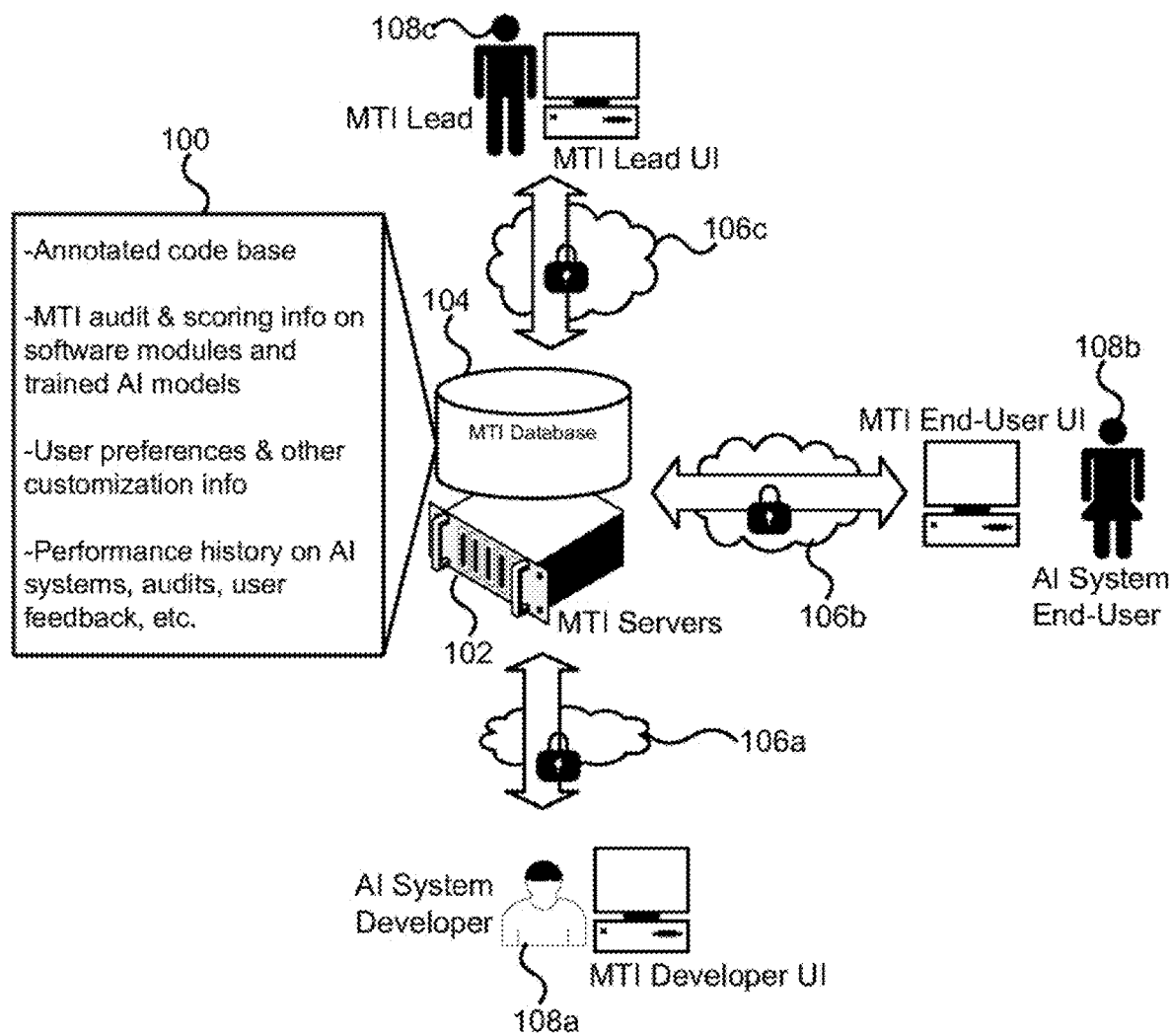
FIG. 1 shows an MTI system overview of a first embodiment.

In accordance with the present disclosure there is provided a method for updating evaluation criteria used in determining a machine trust index of artificial intelligence processes, the method comprising: determining a plurality of evaluation criteria from a pool of evaluation criteria for use in generating a machine trust index (MTI) score for an artificial intelligence (AI) process, each of the evaluation criteria associated with an evaluation process to be used in evaluating the respective evaluation criteria; evaluating each of the plurality of determined evaluation criteria according to the evaluation process associated with the respective evaluation criteria; generating the MTI based on the evaluated evaluation criteria and storing in an MTI database the MTI in association with a time the MTI was generated; using a plurality of generated MTIs stored in the MTI database, determining which evaluation criteria in the pool of evaluation criteria do not contribute to the generated MTI; and removing the evaluation criteria determined not to contribute to the MTI scores from the evaluation criteria pool.

In a further embodiment of the method, the MTI is generated using principal component analysis (PCA).

In a further embodiment of the method, the components evaluated by the PCA comprise the evaluation criteria from the evaluation criteria pool and one or more of: statistical measures of the AI processes results; measures of the absence of bias in the AI processes; an index of trust of the training data of the AI processes; and the ad-hoc programs that return statistical or qualitative values about the AI processes.

In a further embodiment of the method, the statistical measures of the AI processes results comprise one or more of accuracy, precision, and recall.

In a further embodiment, the method further comprises independently determining the statistical measures of the AI processes results by training the AI process with a subset of the training data and using the trained AI process to predict the remaining training data not part of the subset.

In a further embodiment of the method, the MTI database stores a plurality of MTIs generated at a plurality of different times for a plurality of different AI processes.

In a further embodiment, the method further comprises generating a display of the plurality of MTIs for one of the plurality of different AI processes to provide an indication of a development of the MTI over time. The method of claim 1, further comprising generating a display of at least one MTI from each of two or more of the different AI processes to provide a relative measure of trustworthiness of the two or more different AI processes.

In a further embodiment, the method further comprises: receiving additional texts; determining similarity matches between the additional texts and text of one or more evaluation criteria in the pool of evaluation criteria; presenting matches to a user via a user interface; receiving an indication of whether to add a new evaluation criteria to the pool of evaluation criteria based on the presented matches and adding the new evaluation criteria to the pool of questions.

In a further embodiment, the method further comprises: using a subset of generated MTIs stored in the MTI database, determining which evaluation criteria in the pool of evaluation criteria are significant in generating the MTI; and suggesting possible enhancements for improving the results of the significant evaluation criteria.

In accordance with the present disclosure there is further provided a system for updating evaluation criteria used in determining a machine trust index of artificial intelligence processes, the system comprising: at least one processing unit configured to execute instructions; and at least one computer readable memory unit communicatively coupled to the at least one processing unit, the computer readable memory unit storing instructions, which when executed by one or more of the at least one processing unit configure the system to: determine a plurality of evaluation criteria from a pool of evaluation criteria for use in generating a machine trust index (MTI) score for an artificial intelligence (AI) process, each of the evaluation criteria associated with an evaluation process to be used in evaluating the respective evaluation criteria; evaluate each of the plurality of determined evaluation criteria according to the evaluation process associated with the respective evaluation criteria; generate the MTI based on the evaluated evaluation criteria and storing in an MTI database the MTI in association with a time the MTI was generated; using a plurality of generated MTIs stored in the MTI database, determine which evaluation criteria in the pool of evaluation criteria do not contribute to the generated MTI; and remove the evaluation criteria determined not to contribute to the MTI scores from the evaluation criteria pool.

In a further embodiment of the system, the MTI is generated using principal component analysis (PCA).

In a further embodiment of the system, the components evaluated by the PCA comprise the evaluation criteria from the evaluation criteria pool and one or more of: statistical measures of the AI processes results; measures of the absence of bias in the AI processes; an index of trust of the training data of the AI processes; and the ad-hoc programs that return statistical or qualitative values about the AI processes.

In a further embodiment of the system, the statistical measures of the AI processes results comprise one or more of accuracy, precision, and recall.

In a further embodiment of the system, the stored instructions, when executed further configure the system to independently determine the statistical measures of the AI processes results by training the AI process with a subset of the training data and using the trained AI process to predict the remaining training data not part of the subset.

In a further embodiment of the system, the MTI database stores a plurality of MTIs generated at a plurality of different times for a plurality of different AI processes.

In a further embodiment of the system, the stored instructions, when executed further configure the system to generate a display of the plurality of MTIs for one of the plurality of different AI processes to provide an indication of a development of the MTI over time.

In a further embodiment of the system, the stored instructions, when executed further configure the system to generate a display of at least one MTI from each of two or more of the different AI processes to provide a relative measure of trustworthiness of the two or more different AI processes.

In a further embodiment of the system, the stored instructions, when executed further configure the system to: receive additional texts; determine similarity matches between the additional texts and text of one or more evaluation criteria in the pool of evaluation criteria; present matches to a user via a user interface; and receive an indication of whether to add a new evaluation criteria to the pool of evaluation criteria based on the presented matches and adding the new evaluation criteria to the pool of questions.

In a further embodiment of the system, the stored instructions, when executed further configure the system to: using a subset of generated MTIs stored in the MTI database, determine which evaluation criteria in the pool of evaluation criteria are significant in generating the MTI; and suggest possible enhancements for improving the results of the significant evaluation criteria.

In accordance with the present disclosure there is further provided a non-transitory computer readable memory storing instructions, which when executed by a processing unit of a system configure the system to: determine a plurality of evaluation criteria from a pool of evaluation criteria for use in generating a machine trust index (MTI) score for an artificial intelligence (AI) process, each of the evaluation criteria associated with an evaluation process to be used in evaluating the respective evaluation criteria; evaluate each of the plurality of determined evaluation criteria according to the evaluation process associated with the respective evaluation criteria; generate the MTI based on the evaluated evaluation criteria and storing in an MTI database the MTI in association with a time the MTI was generated; using a plurality of generated MTIs stored in the MTI database, determine which evaluation criteria in the pool of evaluation criteria do not contribute to the generated MTI; and remove the evaluation criteria determined not to contribute to the MTI scores from the evaluation criteria pool.

Embodiments are described below, by way of example only, with reference to FIGS. 1-6.

The present description provides a system and method and engineered systems for overcoming many of the social license, trust and accountability issues around the development and use of systems that incorporate AI and ML. It makes major, novel contributions, to the emerging concepts and practice of "Ethical AI" and "Principled AI". In particular, it may provide a flexible and transparent methodology and platform that allows for a quantified measurement of "Machine Trust", referred to as a machine trust index (MTI) against a transparent, configurable and auditable set of measures and criteria. The MTI allows for relative comparisons of different algorithms and models once a common measurement methodology is determined. The platform allows openness of methodologies and results, as well as newly learned measurement methodologies. The MTI platform provides a means to integrate results into systems to automate safeguards where Machine Trust levels are key ingredients. The MTI platform collects machine trust data breadth, depth and over time to allow for deep learning techniques to evolve and improve new trust tools used in analysing AI processes and insights provided. The platform is developed with the recognition that trust is not a binary judgement but an evolution of experience and data.

FIG. 1 depicts an illustrative embodiment of the MTI platform. The MTI platform comprises a secure distributed system for the auditing and scoring of the quality and/or trustworthiness of software with Artificial Intelligence (AI) and/or Machine Learning (ML) components, and/or of the software's developers, development processes, and component algorithms and data structures; and for the development, distribution, deployment and use of such software and components in industrial, business, government, consumer and other applications.

The auditing and scoring may provide a "Machine Trust Index (MTI)" which is administered in a way that is transparent to AI developers, to end-users of the AI-enhanced software, and to the auditors, regulators and other observers. Taken together, the components of this system and framework serve to advance the production and effective use of safer and better understood systems across industries and vertical applications, and therefore to advance the societal goals of "Ethical AI" and "Principled AI".

As depicted in FIG. 1, the MTI platform comprises one or more MTI Servers 102. The MTI servers generate the MTI for AI processes as well as automatically updating the MTI analysis process based on an analysis of past MTIs. The MTI servers 102 also provide interfaces for various actors to interact with the MTI servers. The MTI platform further comprises one or more MTI Databases 104. The databases may store MTI scores and related findings and commentary, information on AI systems, components, developers and projects that are being audited, performance and user feedback histories of those AI systems, components, developers and projects as well as a code repository, where libraries of source and object code can be securely deposited (e.g., "checked in"), stored, accessed ("checked out") and annotated—possibly with associated MTI information associated with or embedded with the code. The MTI databases may also store user preferences and customization information. The database may further include an annotated repository of methods, algorithms and tools that represent best practices, in alignment with the MTI, with the current state of the art in AI/ML and software development, and/or with standards and requirements specific to particular industries or application fields (such as medical biomarker discovery and development, or securities trading).

The MTI servers and databases may communicate with each other as well as other user devices over one or more networks 106a, 106b, 106c. Parts of the overall network may be internet and/or intranets, public and/or privately owned, those networks being implemented by any of several hardware and software methods known to those skilled in the art, including but not limited to fiber-optic, coaxial cable, satellite transmissions, Web 3.0, Web 4.0, HTTP, FTP, VPN, WIFI, 3G, 4G, Ethernet, Bluetooth, etc. The communications and data transfers within the network may be synchronous or asynchronous or a combination of both and the communications and data transfers may be encrypted. Authentication of users may be implemented using biometric methods, digital ID based on block chain, or other methods, as is known to those of normal skill in the art of digital security. Source code and other data or metadata can be kept secure through encryption methods and/or user authentication access methods. Deposits, retrievals, viewings and/or modification of code or data or metadata on the system may be recorded using block chain, hash graphs or other methods of transaction authentication known to those skilled in the art. Some actions and transactions on the network may have associated prices; and users may be charged, using any of a number of methods known to those skilled in the arts of IT and e-commerce, including credit card transactions, PayPal, Bitcoin, Ethereal or other cryptocurrencies.

The MTI servers provide user interface (UI) modules by which users can send, view, and receive data and/or code. User interface modules of the MTI servers may securely provide the user interfaces to user devices over the communication network or networks 106a, 106b, 106c. The user interfaces provided may be tailored to one or more AI system developers 108a ("Developer"), one or more end users of developed AI systems 108b ("End User") and one or more lead or other auditors or assessors 108c ("Lead"). The user interface provided to the devices of the one or more AI system developers 108a may provide functionality to developers to design, develop, test, validate and deposit trained AI modules and other related software into the MTI platform. The UI for developers may include a development environment in which templates, documentation, diagrams, animations, prompts and/or automated analysis routines assist the developer to plan and execute the AI/ML system development tasks in alignment with best practices according to the MTI. The software produced by the Developer(s) and audited/scored by the Leads may contain, or have associated with it, information about the auditing and scoring process and resulting scores. The software may also contain code, which may be provided at least in part by MTI platform functionality, that informs, guides or requires the End Users to perform certain tasks that tend to increase trustworthiness and reliability, for example messages at certain predefined intervals informing the End User that an update of the trained AI model is required or well advised The user interface provided to the devices of one or more leads may provide functionality for leads to by themselves or with automated or other human assistance, examine developers, trained AI models deposited into the MTI framework, component algorithms, training and/or testing data, and the training and development process as well as provide MTI scores and other associated information, warnings, approvals, and other relevant commentary. The user interface provided to the devices of one or more end users may provide functionality for end users to examine, download, install and use software that may contain trained AI models, and may also view any associated MTI scores, warnings, approvals and other relevant commentary and data; and may also add their own usage history, performance assessments and other related commentary. The UI for end users may include a deployment and use environment in which templates, documentation, diagrams, animations, prompts and/or automated analysis assist the end user in deployment and use of the system and its AI/ML components in alignment with best practices according to the MTI. The UIs may have different appearance and/or different logical flows for the different types of Users (e.g., Developers, Leads, End Users), different vertical applications or end-use industrial sectors, users in different jurisdictions, speakers of different languages, developers who develop using different programming languages, environments and/or AI/ML algorithms and tools, specific organizations and/or specific projects and/or specific users ("customization").

The user identities, MTI scores, code base and other information may be made transparent and/or private to different internal and external entities, in secure and authenticated manner, in alignment with a security, privacy and transparency policy for the network and/or in line with individual user or organizational preferences.

The MTI platform 100 of FIG. 1 allows leads to specify criteria for evaluating an AI process and provides functionality to developers of the AI processes or algorithms to design and deposit the AI processes or algorithms to the system to be evaluated according to the specified criteria. End users of the AI processes may also access the MTI platform to view MTI scores of the AI processes they use as well as provide information on the AI processes for use in evaluating the MTI of the AI processes.

Figure 2:
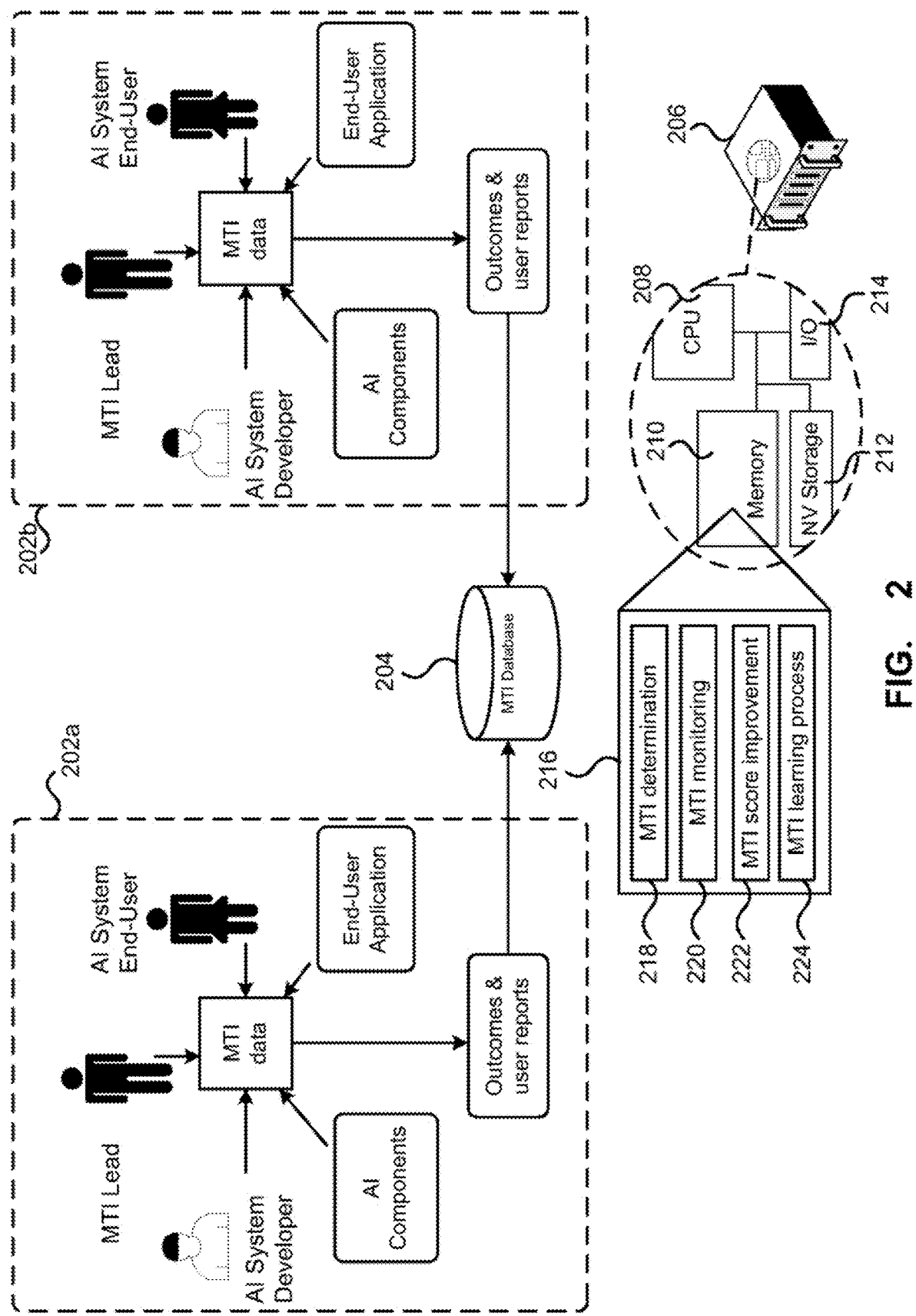
FIG. 2 shows an MTI system overview of a second embodiment with learning.

FIG. 2 depicts an MTI platform for multiple customers, or AI processes. As depicted the MTI system evaluates the MTI for multiple different AI processes 202a, 202b. For each of the AI processes the MTI platform collects MTI data from various sources including, for example the AI components used in the AI processes, end user applications, AI system developers, MTI leads, and AI system end users. The MTI data of each AI process is evaluated by the MTI platform and may generate outcomes and reports. The MTI data, outcomes and/or reports may be stored in the MTI database 204.

The MTI platform provides one or more methods or frameworks by which software code, development processes, developers, and/or projects can be scored or rated for their trustworthiness. The MTI platform may also comprise one or more methods and subsystems for inviting (e.g., "crowdsourcing"), evaluating, and accepting or rejecting (e.g., "voting") new algorithms, model-types, data structures and related methods in the fields of AI and machine learning into the evolving set covered by the machine trust index.

The MTI platform includes one or more servers 206 for providing various functionality. The servers comprises one or more processing devices 208 for executing instructions, a memory unit 210 for storing data and instructions for execution by the processing devices as well as non-volatile storage 212. One or more input/output (I/O) interfaces 214 may be provided for connecting additional devices or components to the processing devices. The instructions stored in memory configure the server to provide various functionality 216. The functionality may include MTI determination functionality 218 for determining an MTI score for one or more of the AI processes 202a, 202b, MTI monitoring functionality 220 for monitoring MTI scores of the AI processes 202a, 202b over time as the AI process and its uses evolve over time. MTI score improvement functionality 222 may help guide changes to the AI processes to improve the MTI score. MTI learning process functionality 224, evaluates the process for determining the MTI score and improves the evaluation process to attempt to make it more accurate, easier and/or cheaper to compute.

The MTI system may contain, or have associated, software for example provided by the MTI learning process functionality 224 that confers the ability for the MTI system to improve its performance over time by human or automated adjustments. Automated adjustments may employ a supervised or reinforcement learning algorithm. Adjustments made by human operators may be guided by insights learned from the data and metadata repositories. For example, automated analysis may indicate which parts of the MTI scoring methods are most correlated with or predictive of good (or bad) outcomes or user feedback, and that may prompt changes to auditing, scoring or weighting procedures for the MTI. Or for example, analysis may indicate especially strong or problematic practitioners, methods, algorithms, and this may prompt human operators to adjust the mix of best practices, approved methods, or provide written or other guidance to users or members of the network, etc. The information on which such adjustments are made may include one or more of recorded developer choices, training and testing methods used, training and testing results, MTI scores and other MTI annotations, of trained models, software modules, development processes, and/or developers; and performance data and/or user feedback, for trained models and/or software modules.

Figure 3:
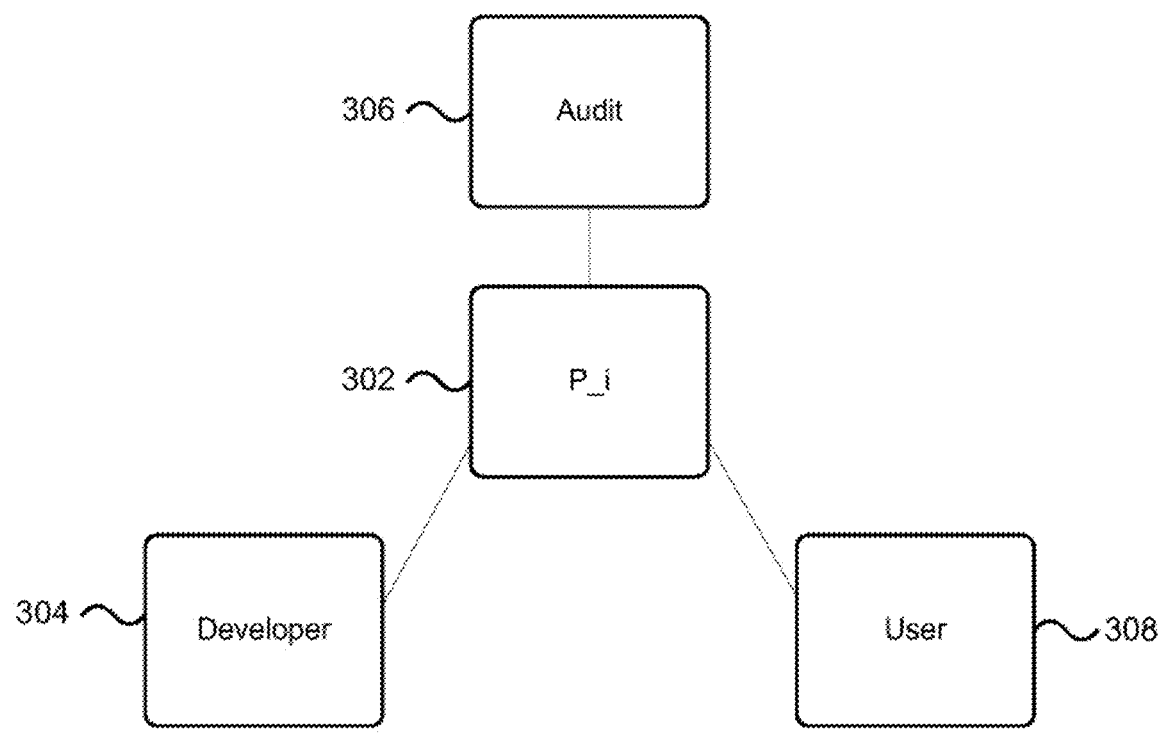
FIG. 3 shows an object representation of an MTI

As described above, the MTI platform may have a plurality of different AI processes or projects. The AI projects may evolve as the AI process is developed, deployed and used. Each project may be stored according to a project object model Definition that supports integration among development, audit and user stages of the life cycle of each AI/ML project within the MTI Framework. As depicted in FIG. 3, a project object model 302 may be provided for each project. Every AI/ML development project or AI process P_i (as in, "ith project in the MTI database", e.g., the 4th or 367th project) is represented in the system as an object with particular procedures or functions (as in "classes" in C++ and related object-oriented programming languages) and data defined across main component parts including main project information and functions; developer information and functions, for some typically small number of data scientists and software developers who plan, design, build, train, test and package the AI/ML models and related or embedding code for that project; audit information and functions, for some (again typically small) number of leads and other auditing, reviewing, scoring personnel who rate the developed models and code according to the MTI or review the models, code and score on behalf of users, regulatory bodies or others; and user information and functions, for some number (possibly very large) of past, current and potential future users of the algorithms, trained models and surrounding code.

With reference to FIG. 3, each AI/ML Project P_i 302 is represented as an integrated, distributed object in which information is shared between the networked modules, and corresponding user interfaces, used by developers 304, audit/scoring 306 personnel (including Leads), and end users 308.

The procedures/functions and data defined within each respective logical section of a project's definition are accessed and used by the respective developer, audit and user modules, and by their corresponding UIs (user interfaces) in order to support and enforce the best practices and relatively higher trust outcomes provided by the MTI.

When instantiated and used for a real AI/ML project on the distributed MTI network system, relevant information may be automatically shared among the developer, audit and user modules in order to support the main Developer=>Lead=>Users value chain (as depicted for example in FIG. 4) ("forward chain") and to facilitate feedback from users and auditors to developers and to the System ("backward chain" or "learning").

Many possible implementations of such information sharing are known to those normally skilled in the arts of object-oriented programming, distributed database, client-server architectures, and so forth. This distributed yet integrated mechanism is illustrated, for some preferred embodiments of the invention, by examples below.

Automated analysis and integration of information across modules supports the process of development, of audit, and of deployment and use of AI/ML enhanced software. This automation may take several forms. For example the developer module 304 may provide functionality to support template-driven development, in which a developer is guided through each choice of model type, model structure, algorithm choice, testing method, and so forth and the choices are stored so that appropriate information can be shared automatically with the audit leads and end users further down the value chain. Template-driven, model-driven, script-driven and structure-driven programming environments are known to those normally skilled in the relevant areas of computer science.

The audit module 306 may provide functionality for template- and script-driven auditing, in which the auditor (e.g., Lead) is guided through the steps of the MTI scoring, the specific sequence and questions conditioned both on the auditor's settings and on the data shared from the developer module of that project. The audit module 306 may provide automated MTI scoring of some sections and component questions or evaluation criteria of the MTI (for example, based on the model types chosen and used by the developer, and on stored results of model testing, validation and simulation procedures.

The user module 308 may provide functionality for template- and script-driven deployment of the model and related code, and customization based on user settings and learned preferences. The user module 308 may provide automated scheduling of check-ins, updates and maintenance of predictive or classification model, related data, etc. The user module may also provide automatic pop-ups or other notifications when MTI trust factors cross into or approach "danger" ranges. For example, when an input case, considered as a data vector, is analyzed to be in a relatively lower-trust or lower-accuracy region of the trained model's input space (e.g., if a facial recognition system has been shown to perform poorly on people with eyeglasses, and the current input case appears to be a face with eyeglasses) the user may be provided with a notification or alert. The user module may also provide automated logging and analysis of input cases, resulting outputs, and resulting decisions/actions (where available and appropriate). Further, the user module 308 may provide automated prompting of end users for feedback on their satisfaction with the system, and other related feedback—that can be relayed back to auditors and developers and/or used in improving the overall MTI scoring methods and system through, for example the longitudinal learning processes.

Relevant information is automatically passed between the developer, audit and user modules for each product, so that for example a lead's MTI scoring process and final score is conditioned on the particular choices made by a developer, and the user's prompts and warnings are also conditioned on those developer decisions and on the lead's scoring information.

As an example the developer, audit and user modules of the code for a Project number i might include structures that look logically something like the following. Specific syntax will depend on the implementation language, programmers' particular coding and naming style preferences, and so forth, as understood by those skilled in the art.

```
P[i].ProjectName   # Character string - name of project
P[i].ProjectStart  # Start date for project
P[i].History       # Data structure recording history of actions,
   transactions, outcomes for Project
P[i].Dev # Complex hierarchical structure capturing Developer
   info
P[i].Audit    # ... structure capturing Audit and Lead info
P[i].User     # ... structure capturing User-side info for this
   Project
...
P[i].Dev.DevPlan      # A data structure representing the plan &
   key assumptions for the ML work
P[i].Dev.Data.Training    # Structure for the training data
P[i].Dev.Data.Testing     # Testing data
P[i].Dev.PreprocessingAlgos    # List of data cleaning &
   preprocessing algos (functions)
P[i].Dev.ML.ModelTypesChosen   # Which model types did
   Developers use, e.g., decision tree
P[i].Dev.ML.TrainingAlgosChosen  # Which model training
   algorithms were used
...
```

Integration of information between the Developer, Audit and User modules for the project can then be used to determine and/or guide auditing and MTI scoring, to warn users of potential trust issues, etc., by means of logic like the following (Python-like pseudocode shown for illustration purposes only).

```
# For MTI model transparency scoring, penalize neural nets,
     reward decision trees,  linear etc.
if P[i].Dev.ML.ModelTypesChosen.Final.Type == NeuralNet
   P[i].Audit.MTIScore.ModelTransparency = 0;
if P[i].Dev.ML.ModelTypesChosen.Final.Type == DecisionTree
   P[i].Audit.MTIScore.ModelTransparency = 1;
if P[i].Dev.ML.ModelTypesChosen.Final.Type == LinearClassifier
   P[i].Audit.MTIScore.ModelTransparency = 1;
...
# Poor cross-validated generalization performance is one of
     several signs of insufficient data
# Having more "columns" (variables) than "rows" (samples,
     cases) is another warning sign
# so set a Boolean flag that will trigger a warning and prompt
     the Lead / Auditor to dig into the
# assumptions and methodology used around data sufficiency and
     data acquisition
if ( P[i].Dev.ML.CrossValGeneralizationPerf <
         P[i].Audit.AcceptableGeneralizationPerf
   OR
   P[i].Dev.Data.Training.NumCols >
         P[i].Dev.Data.Training.NumRows )
   P[i].Audit.MTIFlags.InsufficientTrainingData = True;
...
# If the overall MTI score of a particular trained model /
     system is below a User's selected
# acceptable threshold, inform User and don't allow deployment
     of code.
# If it's above that threshold but still too close to that
     level, issue User appropriate warnings
# including specifics regarding the particular areas of MTI
     weakness.
If P[i].Audit.MTIScore.OverallScore <
       P[i].User[CurrentUserNum].MinAcceptableMTIScore
   LockModuleWithErrorMessage( );
If Abs(P[i].Audit.MTIScore.OverallScore –
       P[i].User[CurrentUserNum].MinAcceptableMTIScore)    <
       P[i].User[CurrentUserNum].MTIScoreWarningRange
   WarnUserAboutMTIProblems(P[i].Audit[.MTIScore.AuditTrail);
```

Figure 4:
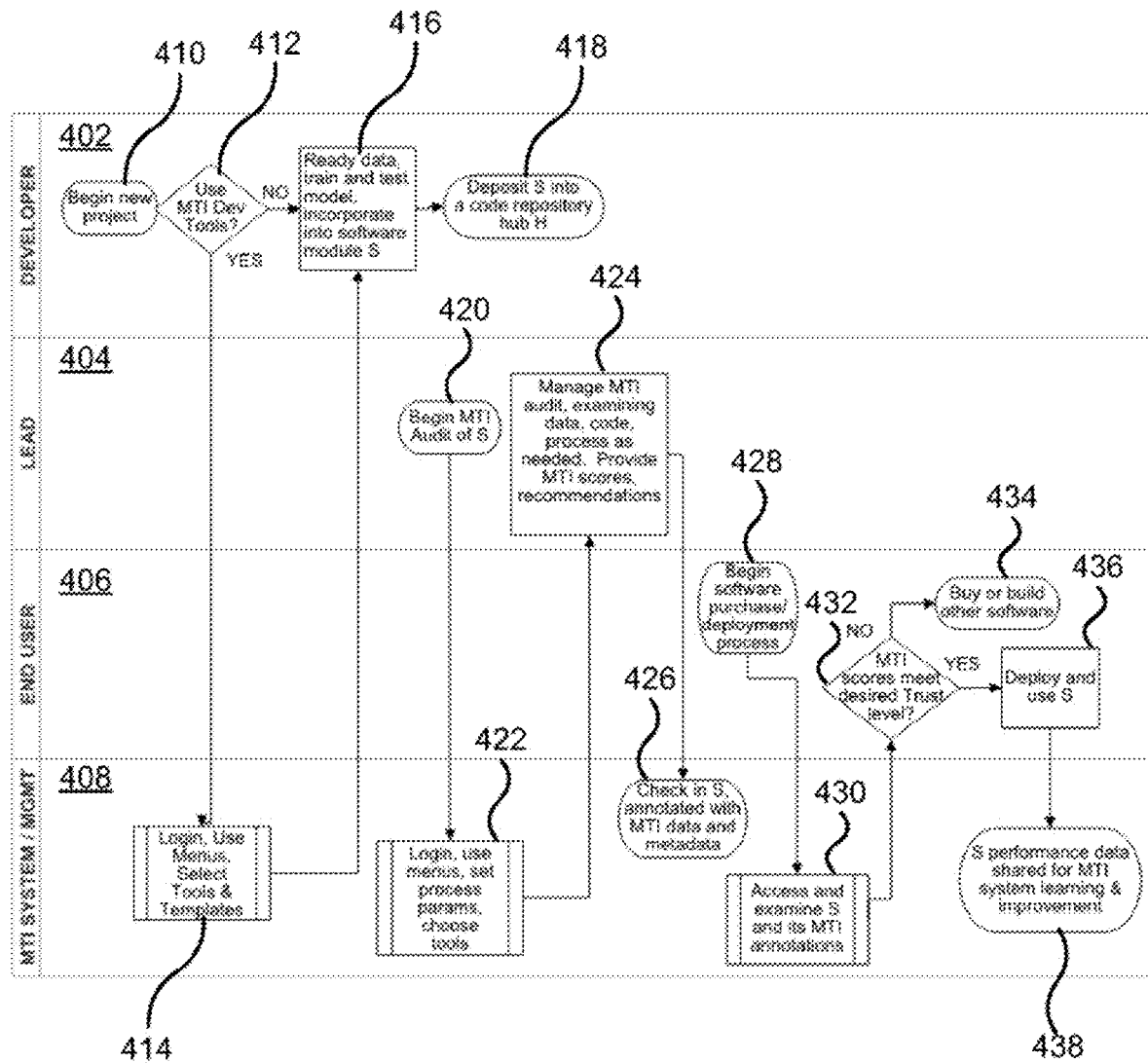
FIG. 4 shows a main MTI process flow.

FIG. 4 depicts the interaction between the various components or modules of the MTI platform. A developer 402 may begin a new project (410) and decides whether to use the development tools provided by the MTI platform or not (412) to develop the AI process or project. If the developer chooses to use the MTI development tools (yes at 412) the developer logins into the MTI system 408 and uses menus, and various tools and templates provided by the MTI system to develop the AI process (414). Regardless of how the developer develops the AI, the data is readied, and an AI model is trained and tested (416) and incorporated into one or more software modules CS'. Once the AI software module(s) are developed they can be deposited into a code repository for the project (418). A lead 404 may at some point decide to begin the MTI audit/scoring of the software module(s) S that have been developed (420). The lead may login to the MTI system (422) and use menus, interfaces etc. to set process parameters, choose evaluation tools and evaluation criteria. Using the MTI system, the lead manage the MTI audit including for example examining, whether using automated processes or manually, data, code and processes as needed in order to generate an MTI score and any recommendations. Once completed, the audit results may be checked in and the software module S may be annotated with the MTI data and metadata (430).

An end user 406 may begin a software purchase or deployment process (428) for the software CS' and accesses and examines the software module S along with the MTI information (430). The end user decides if the MTI scores meet the desired trust level (432) and if they do not (No at 432), may buy or build other software (434) or require further development of the software S until it does meet the requirements. If the MTI score meets the desired trust level (Yes at 432) the software S may be deployed and used (436). The software S provides the MTI system with performance data (438) for learning and improvement of the MTI system itself, as well as ongoing MTI audits of the software S.

A goal of the MTI system learning is to improve the performance of the MTI system over time. One possible means to do this is to define a "Predicted Trustworthiness" in terms of a weighted sum of MTI scoring components, and an "Actual Trustworthiness" based on user feedback and reported outcomes, and then to minimize the difference between Predicted and Actual values, over time, by adjusting the weightings. For example:

$$TPred\_i = \text{Predicted\_Trustworthiness of Project } I = F(SUM\_j[w\_ij * a\_j]),$$

Summations may be over Projects and over component Trust Attributes of each Project. These Attributes may include MTI sub-scores for each component section, and the $w\_ij$ are "weights", i.e., coefficients that reflect the current weighting of each jth Attribute within this ith Project. F( ) is a function (e.g., a logistical function) that linearly or non-linearly transforms its input into an output in the range [0 . . . 1].

$$TActual\_i = \text{Actual Trustworthiness of Project } i = \text{TrustFeedback}(i),$$

Tactual_i is a number in the range [0 . . . 1] derived from User feedback and outcomes. In some embodiments, an objective function used is the sum of squared difference between the predicted and actual trustworthiness scores for each Project, over all Projects for which there is both Predicted and Actual Trustworthiness data. Hence E=SUM_i [T_Pred−T_Actual]^2 and, as is known to those normally skilled in the relevant mathematics and computer science, it is easy to define the partial derivatives of E with respect to the weights, and to use that gradient information in any of a number of optimization methods to find the values of those w_ij coefficients that tend to minimize that function E. This optimization or learning, may take place at regular intervals, automatically, according to a schedule defined by the managers of the MTI System network.

The invention provides a method for AI-enhanced systems to be developed, audited/scored and used, in ways that tend to increase the trust that users and other stakeholders have in the software, its development process, its developers, and its likely behavior in end-use systems and applications. The MTI platform allows one or more developers working with data and ML methods to train a model, test the model, and incorporate the trained and tested model into some application software that performs one or more tasks. One or more leads may, using the MTI platform, perform an assessment of the trained model, the data used for training, testing and/or validation, the encompassing software application, the training/development process and/or of the developer(s) overall professional standards in determining an MTI score and report those assessments. One or more end users may access, from the MTI platform, information about the trained model and/or application software and/or development process and/or developers, and based on that information decide whether to access, purchase, download, deploy and/or use the model and/or software.

The MTI assessment may include both automated and manual evaluation of the AI software or process when determining an MTI score. The following tables depict illustrative examples of types of assessments and scoring that may be included in the MTI assessment.

| | Score Ranges | | |
|---|---|---|---|
| Data Risks | Low | Med | High |
| Bias | No explicit strategy for addressing bias | Have an anti-Bias strategy Evidence of efforts to obtain representative data for training Evidence of effort to analyze data for possible bias | Strong anti-Bias strategy for lifetime of data & derived models Evidence of effort/plan to obtain representative data for training AND for periodic updating of model over usage lifetime Demonstration of minimized bias via principled methods such as cross validation, MCMC, other statistical analyses |
| Privacy/ Security | Not following an organizational or industry-standard Privacy policy Weak or ad hoc | Have/follow a Privacy policy Evidence of moderate efforts and methods to ensure privacy and | Have/follow a strong Privacy policy Strong efforts, using best-in-class |

-continued

| Data Risks | Score Ranges | | |
|---|---|---|---|
| | Low | Med | High |
| | protocols for privacy, security, permission, informed consent, etc. | security of data during system development | methods of encryption, user authentication, etc., documented for every step in data provenance & usage chain |
| Quality (Clean) | Significant missing data and/or noisy data problem No or poor methods to ameliorate (e.g., Complete Case Analysis) | Moderate levels of missing/noisy data Moderately principled methods to address it (e.g., Multiple Imputation) | Insignificant levels of missing/noisy data AND/OR Strongly principled amelioration methods (e.g., full Bayesian model of data + error) with auditable record of assumptions, methods, results |
| Quality (Sufficient) | Evidence that data is likely woefully insufficient (e.g., Samples M << Variables N), with no coherent strategy to address it, nor clear assumptions or evidence of low intrinsic dimensionality and linear relationships, nor evidence of strong generalization performance of appropriate models on available data | Have a strategy to assess and address data sufficiency Some reasonable analysis work via data exploration, assessing dimensionality (e.g., VC dimension), and assessing generalization performance of one or more classification/regression models | Have robust strategy to acquire relevant, representative data for training, testing and beyond. Analysis with a number of different, principled methods to assess data dimensionality and limits on generalization capability. (E.g., Bayesian model selection or averaging, cross-validation, learning curve analysis, etc.) Clear, auditable statements of assumptions about input and output data distributions and likely nature of input –> output relationships, and how those assumptions guide chosen methodology |

| Algorithm & Model Issue | Score Ranges | | |
|---|---|---|---|
| | Low | Med | High |
| Preprocessing & Input Data Representation | Little or no data exploration Preprocessing is ad hoc or inadequate for subsequent stages, and/or destroys likely important information | Evidence of some coordinated strategy/plan for exploratory analysis and preprocessing based on defensible assumptions about data and the models to be used in subsequent stages | Strong strategy and plan for all steps preprocessing Clear, auditable assumptions, underlying data model and principled analysis guides representation decisions |
| ML Algos, Model Training & Testing Quality & Choices | Tried (or reported trying) only 1 method. | Tried & reported results for at least 2-3 different | Clear statements of assumptions and goals underlying |

| Algorithm & Model | Score Ranges | | |
|---|---|---|---|
| Issue | Low | Med | High |
| | Minimal or ad hoc testing & validation. | algorithms. Evidence of some significant testing and cross-validation. | choices of 3 or more methods, including clarity re models, objective functions, optimization methods. Significant testing & statistical validation using principled methods (e.g. Bayesian, MCMC) |
| Controls | No or minimal controls on verifying and securing source and object code, version control, traceability, etc. Easy for code or model to fall into "wrong hands" | Evidence of moderately effective verification & security of source & object code, version control, access control | Evidence of best-in-class approaches to securing code, clear version control, traceability. Access controlled with best-in-class methods, e.g., strong encryption, multi-factor authentication, biometrics. |

| System Open, | Scores Range | | |
|---|---|---|---|
| Transparent | Low | Med | High |
| Model & its Decisions Interpretable? | Used less-interpretable model type (e.g., deep and wide multi-layer neural net with nonlinear activation functions) No attempt at post-hoc analysis of trained model. Decisions only "explainable" with complex sets of formulas with many variables. | Used at least one relatively more interpretable model type (e.g., decision tree or linear regression) OR Performed some reasonable post-training analysis. (E.g., LIME method) | Embedded models and training within principled framework (e.g., Bayesian) modeling the inputs and outputs and decision framework. Decisions can be characterized in terms of probabilities or likelihoods, and in terms of reasonably small number (<10) key variables understood by users and/or domain experts. |
| System Behavior Predictable? | No testing or analysis of full system with embedded trained mode No or minimal explanation of ranges and types of possible classification or prediction errors. | Evidence of some testing of trained model and/or analysis of boundary cases, erroneous input, extreme conditions. Some explanation given of types and ranges of possible errors. | Robust strategy, plan & execution of testing and systematic analysis and simulation of system behavior under various use cases, extreme conditions, diverse inputs, boundary cases. Clear explanation and/or illustration of types and ranges of possible errors, e.g., ROC curves, bias/variance tradeoffs, false |

-continued

| System Open, Transparent | Scores Range | | |
|---|---|---|---|
| | Low | Med | High |
| | | | positives vs. false negatives |
| Understandability of System Use (UI/UX, documentation) | Little or no strategy around UI design and testing, documentation, etc. | Reasonably clear & full documentation. Thoughtful approach to design and testing of UI/UX. | Very clear, comprehensive documentation (potentially including online demos, "tool tips"). Systematic approach to UX, with e.g., user personas, iterating user feedback on prototypes, to help ensure users will be able to understand use, limitations, risks of system |
| Security & Auditability | No or minimal controls on verifying and securing source and object code, version control Minimal or no traceability | Reasonable security measures and protocols in place Auditable history of significant portions of data, models, methods, algorithms, code | Evidence of best practices in securing access to code, authenticating code, developers, auditors and users. Have full, readable history ("audit trail") of data, assumptions, methods, algorithms, models and system from conception through development, testing, deployment and initial use. |

The MTI platform or system described above provides tools for evaluating, and or managing the trustworthiness of an AI system throughout the lifecycle from development, deployment and using. Developers may be guided or aided in their system development by guidelines or instructions in accord with a machine trust index (MTI). The guidance may be implemented in software that prompts, guides or requires the Developer to use MTI-aligned best practices. Leads responsible for the MTI assessment may make choices as to how they wish to conduct their audits and scoring, for example as to which assessments/scoring they will do themselves or assign to other assessors; and regarding which assessments/scoring is to be performed wholly or in part by automated methods. These choices may be guided by software, for example selected from menus or similar tools as implemented in a user interface to a computer system. The end user may evaluate the use of software to determine if it meets their particular requirements for trust as well as provide feedback, use and performance information that can be used in further MTI audits of the software as well as improving the MTI platform itself.

Figure 5:
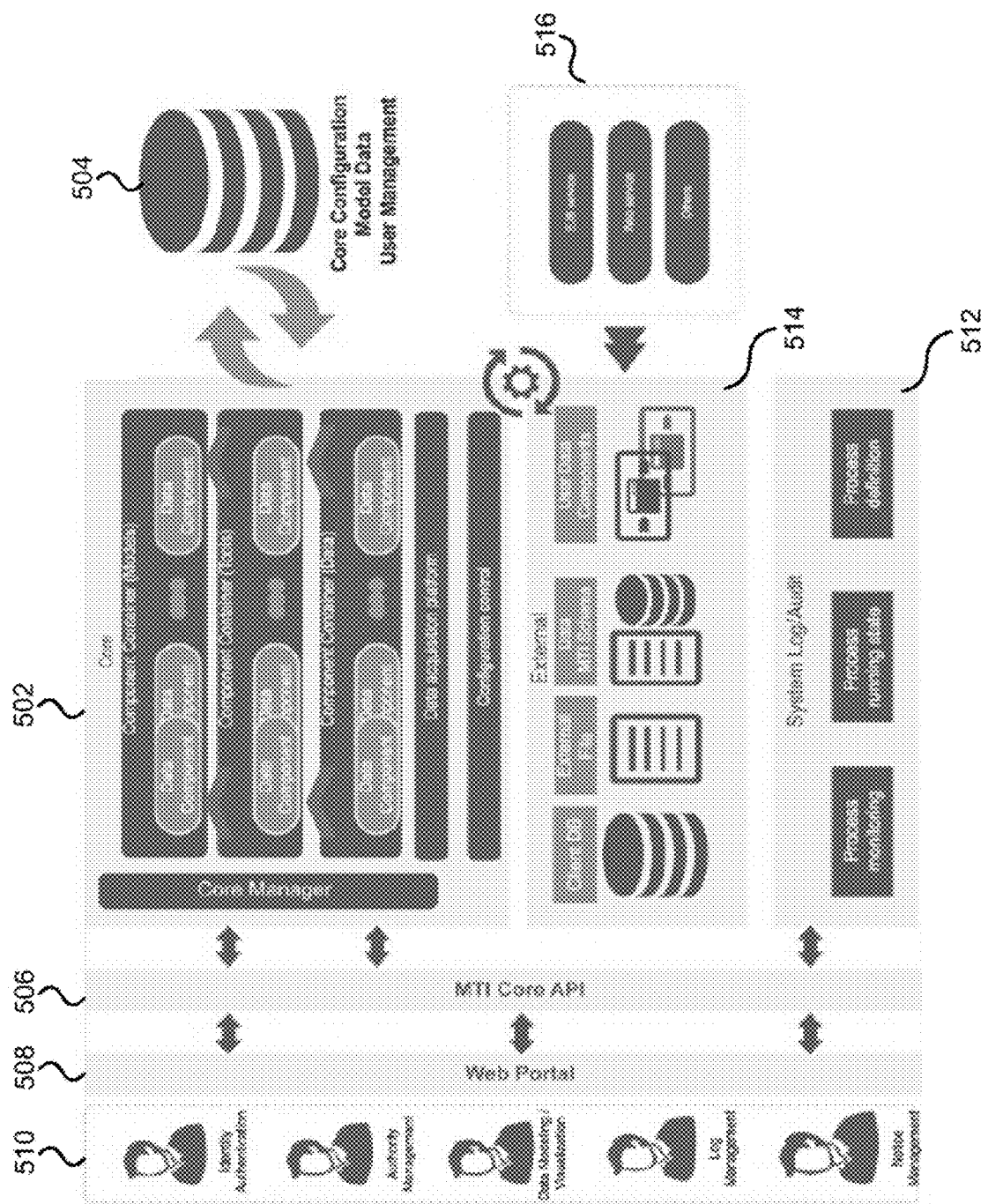
FIG. 5 depicts components of an implementation of an MTI system.

FIG. 5 depicts illustrative components of an MTI platform. The MTI platform 500 comprises core functionality 502 that includes a core manager that controls the overall operation of the MTI platform. MTI models may be represented as an implementation of a component container. Similarly, tools used in evaluating AI software may be represented as an implementation of the component container. Similarly, data associated with the evaluation of the AI software may be represented as an implementation of the component container. A data acquisition platform allows models, tools and data, to be acquired and a configuration control allows the component containers of the models, tools and data to be configured as required for the AI software being evaluated. The core configuration and model data may be stored in one or more databases along with user management information. The MTI core functionality 502 may be exposed through an MTI core application programming interface 506 or similar functionality. A web portal 508 may use the MTI core API in order to provide various functionality 510 to users, including for example identity authentication, authority management, data modeling/visualizing, log management and notification management. Further, the MTI core API may also allow MTI system logging and MTI auditing functionality 512 to interact with the MTI core in order to evaluate the AI software. The auditing functionality may include process monitoring functionality, information about the running state of a process as well as process definitions for defining how an AI software or process is audited.

The MTI core API may also be used by external functionality 514 in order to provide additional functionality to the MTI system. The external functionality may include, for example, providing interfaces to a client's database, interfaces for accessing external files and data for MTI schemas. Further, the external functionality may provide user data components for evaluating data or providing data to the system for use in auditing the AI software. The external functionality may be provided using various different technologies 516, including for example an EJB service, web service or other functionality.

The implementation depicted in FIG. 5 is intended to provide an illustrative implementation of the MTI system and functionality described above. It will be appreciated that other implementations are possible.

As described above, the MTI platform may not only evaluate or audit the trustworthiness of AI software, it may also provide tools for use in the development of the AI software. The tools provide an environment in which an AI algorithm can be setup and configured. The tools may provide access to a code base from deployed AI algorithms to be audited, or the algorithm may be created in the environment using code and libraries available in the environment. If an AI program is being developed in the MTI development environment, the environment may suggest algorithms or other implementation details based on best practices stored by the MTI system. The MTI development environment may allow for the training of AI algorithms developed within the environment.

As described above, an MTI score may be generated for AI algorithms or process. The MTI, or MTI score, may be useful in evaluating how much the Artificial Intelligence (AI) processes in a particular environment can be trusted, computing and monitoring the evolution of this MTI in time, guiding changes to the enterprise so that the trust in the AI can be improved. Further, as the process is practiced, various aspects of the MTI evaluation may also be improved to make the MTI process more accurate and easier/cheaper to compute.

The MTI may be a numerical index which summarizes several aspects of an AI application in a particular enterprise (the Client). The higher the value of the MTI the more trustworthy the AI system/infrastructure is. This MTI is intended to be used for comparative purposes, e.g. to compare different AI processes that solve the same problem, to see how the trustworthiness of a system improves or worsens with time, or how much some particular updates/changes improve the trustworthiness of the system.

Artificial Intelligence comprises applications or programs which perform tasks which resemble the way intelligent humans operate. It is a well-known and well established branch of Computer Science. Machine Learning (ML) is a very important subset of AI, it is concerned with algorithms that learn from past data sets (training data) and attempt to predict the outcomes of new data. (autopilot or automatic driving for cars, sentiment analysis in social media, financial or credit card fraud detection, natural language processing, ad recommendation strategies, assisted medical diagnostic, etc.). Training data may be the enterprise data, usually historical data or data collected for this particular purpose, which serves as a model to train the AI/ML processes. The training data normally continues to grow through time (i.e. Learning Data) with new cases that are deemed to be especially significant and/or new. Occasionally old irrelevant data or duplicated data is removed.

An AI process is a computational process or processes in practice at the Client (any of the previously mentioned or more specific to an enterprise environment, e.g. ranking of job resumes, assisted job performance evaluation, scheduling of services 24/7, etc.). In general these processes will be in operation or in the design phase, but are operational in the sense that can be run and/or tested. The MTI platform does not necessarily need information on the internal details of these AI processes, but rather just needs information on what data they will use, what results they are expected to produce and should be available for training with new data and available for testing. The Client model/algorithm may be installed or deployed in an MTI development environment.

Figure 6:
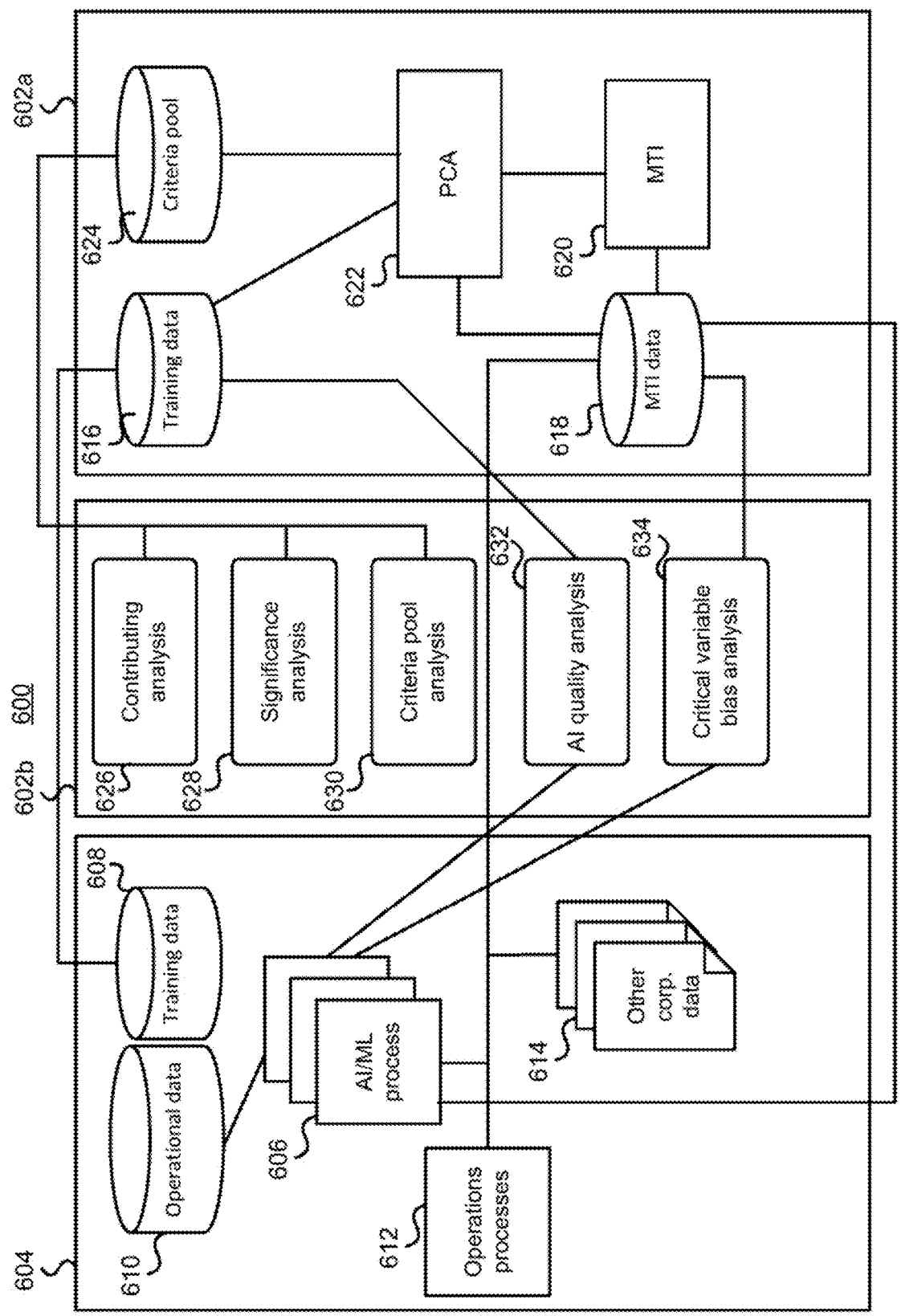
FIG. 6 depict components of a client system and MTI system.

FIG. 6 depicts a use of the MTI platform. An MTI system may comprise MTI evaluation components 602*a* for generating, or scoring/auditing, of MTI scores for an AI process. Additionally, the MTI system may include MTI learning components 602*b* for improving the MTI evaluation components. Further, the environment includes client components 604 that provide the AI process used by the client. The client components 604 may interact with both the MTI evaluation components and the MTI learning components. The client components 604 may include the AI processes 606 that are being evaluated by the MTI platform as well as the training data 608 and operational data 610 used by the AI processes. The client components may include additional operation processes 612 used by the client as well as other corporate data 614 of the client.

The training data 608 may be provided from the client's training data 608 and stored as training data 616 in the MTI system, or the client may otherwise provide access for the MTI system to the training data. Additionally, the client may provide MTI data including, for example the AI processes used to the MTI system, which may be stored in for example an MTI data database 618. In order to generate an MTI 620, the MTI system may use principal component analysis (PCA) functionality 622. PCA is a technique from statistics to find the dominant shape and direction in a cloud of points. The term PCA is used herein not only to describe this exact analysis but also any other statistical analysis which has as a purpose finding the main components or the main directions or the main characteristics of a set of points in multiple dimensions. The PCA may use data from the MTI data, the training data as well as an evaluation criteria pool 624. The evaluation criteria pool provides a plurality of different evaluation criteria that may be useful in evaluating an AI process. Each of the evaluation criteria in the pool may be associated with an evaluation process for evaluating the criteria. For example, an evaluation criteria may be a question regarding how the training set was selected, and the evaluation process may be a questionnaire that is scored manually. Additional evaluation criteria may include, for example classical statistical measures of the AI processes results. Examples of these measures include accuracy, precision, recall, informedness, F1 score, Matthews correlation coefficient, AUC, etc. All these are well known measures in statistics and are applicable to almost any AI process. These evaluation criteria may be associated with automated evaluation processes for automatically determining the measures. An absence of bias evaluation criteria may measure the lack of influence of some variables designated as sensitive (e.g. gender, race, civil status, profession, etc.) in the AI processes. The variables may be selected by the Client. The absence of bias criteria may be associated with an evaluation process of automatically measuring the influence of these variables in the result and subtracting them from the influence of the same variable when it is randomly permuted in all the dataset (which provides the "zero-knowledge" level of a variable). A training data trust evaluation criteria may be an index computed over the training data. Among other things it measures completeness, consistency, uniform coverage, lack of contradictions, lack of duplication, data independence, etc. The evaluation process of this criteria may include an automated process that computes part of this index by programs and part by answers to a set of predefined questions (e.g. is the data secure, who collected the data, who approves new data, who has access to the data, is it properly backed up, etc.). Further evaluation criteria may be provided as a pool of critical questions. These are a variety of groups of questions which have been collected over time by the MTI platform and can be answered either by a yes/no answer, or by a number of discrete options or by a numerical value. The different pools of questions may be dynamic in two different senses: (a) MTI experts may add new questions depending on the nature of Client operations, (b) the existing questions may continuously analyzed to test for their effectiveness. E.g. a question which always comes with the same answer is useless. A question which is completely uncorrelated with the MTI is also useless. Further evaluation criteria may include evaluation programs that are ad-hoc programs which are run over the DB and return statistical or qualitative values about the AI process which contribute to the MTI.

The PCA may use various components or evaluation criteria, in calculating the MTI score. Each of the evaluation criteria may comprise different weightings in determining their impact on the MTI score. For example, a client that is not concerned with privacy may place less importance on keeping training data secure as compared to a medical client that must keep all data secure. The MTI score may be useful as a quantitative measure of the trustworthiness of the AI processes of the Client. It may also provide a relative measure of the trustworthiness of different/competing AI processes which address the same problem, when the MTI score is computed in the same manner, that is the evaluation criteria and weightings are the same or comparable. Further, the MTI score may be periodically computed and provide a measure along time, which shows how the AI processes are improving or worsening. Further, the MTI score may be used as a guide for the developers of the AI processes to allow them to perform the changes or developments that will increase the trustworthiness of the system, as well as a procedural/operational guide for the entire process. Further, the MTI score may be used as a guide for the collection, updating, cleansing and actualization of the training data.

In addition to evaluating a trustworthiness of a client's AI process, the MTI system may also include functionality or processes for improving the MTI evaluation process. The functionality may be provided by the MTI learning components 602b and may include contributing analysis functionality 626, significance analysis functionality 628, criteria pool analysis functionality 630, AI quality analysis functionality 632 and critical variable bias analysis functionality 634.

The contributing analysis functionality may provide a process which determines, for each of the components of the MTI, which are contributing and which are not. This is to remove the ones which are not contributing and will create noise in the MTI plus be expensive to collect/maintain. This is a statistical/ML based process. More precisely, this could be implemented in several ways, e.g. (i) with the idea of "permutation importance", a well-known technique in the ML community, (ii) with the algorithm LIME (Ribeiro et. al. 2016), which is incorporated herein by reference in its entirety, and for which there is a public implementation in GitHub, (iii) by the computation of the correlation coefficients between the independent variables and the dependent variable, (iv) by a combination of these previous methods. Additionally, randomly permuted columns should be added to the analysis (except for (i) above which is already taken into account in its process). The randomly permuted columns provide a barrier beyond which no independent variable should be kept. That is if an independent variable performs as well as a randomly permuted one, it can be safely removed.

Significance analysis functionality 628 provides a process which determines which are the most significant components for building the MTI and suggests possible enhancements to these values (e.g. more accurate data or more frequent collection or useful mathematical transformations of the data). This is a statistical/ML/AI based process. This uses the same techniques as in the contributing analysis functionality above, but instead of looking at the worst performers it looks at the top performer and the ones which are statistically better than the randomly permuted columns.

Criteria pool analysis functionality 630 provides a process which analyses the pools of questions, or evaluation criteria, which are written in human-readable form and takes as additional input human-readable rules, procedures, laws, best practices, standards, etc. and suggests possible new questions to be added to the pools. This is a Natural Language Processing (NLP)/ML application. This process uses tools to find similarity of texts between the questions in the pools and the human-readable additional texts. Once matches are found, they are shown to the expert who will conclude if new or a modified questions or evaluation criteria should be added to the pool. Similarity of texts can be done by "word count vectors", or by "k-gram" analysis or by "probabilistic finite automata" all well known in the area of NLP. NLP is a collection of techniques, well known in the area of Computer Science, which analyze human-readable text with the intention of finding: (1) meaning, (2) structure/syntax, (3) sentiment, and (4) classification (in predefined classes).

AI quality analysis functionality 632 provides a processes to determine, independently, any of the numerical values of quality of the AI processes (accuracy, precision, recall, etc.). These will take as input the AI processes, and the training data, train the AI processes with subsets of the data and use these processes to predict the rest of the training data. This may provide a higher form of cross-validation. The AI processes here are used as black boxes. The computation of the quality measures may be run outside the systems that train the predictors, as these typically contain mistakes or use information inappropriately, for example it is customary to use properties of the whole distribution, which means that the algorithm knows something about the cases it is trying to predict. The principle of cross validation states a clear/total separation between the training data and the data to be predicted. Each data point should be predicted the same number of times. Since this process contains the randomization of the separation of training/testing data, it can be run several times to conclude statistical information about the confidence margins of the quality indices.

Critical variable bias analysis functionality 634 provides a process to determine the bias level on any of the critical variables identified by the Client. This may be a statistical/mathematical/ML process which takes as input each identified critical variable, the training data and the AI processes (as black boxes) and produces an index of bias. This uses the same techniques as in (A) or (B) twice for each critical variable. Once for the variable as is and once for the variable once randomly permuted. The index that is returned is the numerical difference between second minus the first. By running the analysis on the randomly permuted variable several times, we can approximate its distribution and also provide a statistical confidence interval for the "bias" or "lack of bias".

As described above, the MTI learning components may be used to improve the MTI system itself in order to make the MTI evaluation process more efficient and effective.

Each element in the embodiments of the present disclosure may be implemented as hardware, software/program, or any combination thereof. Software codes, either in its entirety or a part thereof, may be stored in a computer readable medium or memory (e.g., as a ROM, for example a non-volatile memory such as flash memory, CD ROM, DVD ROM, Blu-ray™, a semiconductor ROM, USB, or a magnetic recording medium, for example a hard disk). The program may be in the form of source code, object code, a code intermediate source and object code such as partially compiled form, or in any other form.

It would be appreciated by one of ordinary skill in the art that the system and components shown in FIGS. 1-6 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

What is claimed is:

1. A computer implemented method for used in determining a machine trust index of artificial intelligence processes, the method comprising:
   determining a plurality of evaluation criteria from a pool of evaluation criteria for use in generating a machine trust index (MTI) score for an artificial intelligence (AI) process, each of the evaluation criteria associated with an evaluation process to be used in evaluating the respective evaluation criteria;
   evaluating each of the plurality of determined evaluation criteria according to the evaluation process associated with the respective evaluation criteria;
   executing an MTI determination process to generate the MTI score based on the evaluated evaluation criteria;
   storing in an MTI database the MTI score in association with a time the MTI score was generated;
   receiving feedback associated with trustworthiness of one or more AI process each associated with a respective MTI score and storing in the MTI database
   automatically applying a supervised or reinforcement learning algorithm to a plurality of generated MTI scores stored in the MTI database to determine which evaluation criteria in the pool of evaluation criteria are predictive of a particular feedback received about the plurality of AI processes;
   automatically adjusting the MTI determination process based on which evaluation criteria are predictive of the particular user feedback;
   receiving additional texts;
   determining similarity matches between the additional texts and text of one or more evaluation criteria in the pool of evaluation criteria;
   presenting matches to a user via a user interface;
   receiving an indication of whether to add a new evaluation criteria to the pool of evaluation criteria based on the presented matches and adding the new evaluation criteria to the pool of questions
   using a subset of generated MTIs stored in the MTI database, determining which evaluation criteria in the pool of evaluation criteria are significant in generating the MTI; and
   suggesting possible enhancements for improving the results of the significant evaluation criteria.

2. The method of claim 1, wherein the MTI is generated using principal component analysis (PCA).

3. The method of claim 2, wherein the components evaluated by the PCA comprise the evaluation criteria from the evaluation criteria pool and one or more of:
   statistical measures of the AI processes results;
   measures of the absence of bias in the AI processes;
   an index of trust of the training data of the AI processes; and
   the ad-hoc programs that return statistical or qualitative values about the AI processes.

4. The method of claim 3, wherein the statistical measures of the AI processes results comprise one or more of accuracy, precision, and recall.

5. The method of claim 3, further comprising independently determining the statistical measures of the AI processes results by training the AI process with a subset of the training data and using the trained AI process to predict the remaining training data not part of the subset.

6. The method of claim 1, wherein the MTI database stores a plurality of MTIs generated at a plurality of different times for a plurality of different AI processes.

7. The method of claim 6, further comprising generating a display of the plurality of MTIs for one of the plurality of different AI processes to provide an indication of a development of the MTI over time.

8. The method of claim 1, further comprising generating a display of at least one MTI from each of two or more of the different AI processes to provide a relative measure of trustworthiness of the two or more different AI processes.

9. A system for determining a machine trust index of artificial intelligence processes, the system comprising:
   at least one processing unit configured to execute instructions; and
   at least one computer readable memory unit communicatively coupled to the at least one processing unit, the computer readable memory unit storing instructions, which when executed by one or more of the at least one processing unit configure the system to:
      determine a plurality of evaluation criteria from a pool of evaluation criteria for use in generating a machine trust index (MTI) score for an artificial intelligence (AI) process, each of the evaluation criteria associated with an evaluation process to be used in evaluating the respective evaluation criteria;
      evaluate each of the plurality of determined evaluation criteria according to the evaluation process associated with the respective evaluation criteria;
      execute an MTI determination process to generate the MTI score based on the evaluated evaluation criteria;
      storing in an MTI database the MTI score in association with a time the MTI score was generated;
      receive feedback associated with trustworthiness of one or more AI process each associated with a respective MTI score and storing in the MTI database;
      automatically apply a supervised or reinforcement learning algorithm to a plurality of generated MTI scores stored in the MTI database to determine which evaluation criteria in the pool of evaluation criteria are predictive of a particular feedback received about the plurality of AI processes;

automatically adjust the MTI determination process based on which evaluation criteria are predictive of the particular user feedback;

receive additional texts;

determine similarity matches between the additional texts and text of one or more evaluation criteria in the pool of evaluation criteria;

present matches to a user via a user interface;

receive an indication of whether to add a new evaluation criteria to the pool of evaluation criteria based on the presented matches and adding the new evaluation criteria to the pool of questions;

using a subset of generated MTIs stored in the MTI database, determine which evaluation criteria in the pool of evaluation criteria are significant in generating the MTI; and suggest possible enhancements for improving the results of the significant evaluation criteria.

10. The system of claim 9, wherein the MTI is generated using principal component analysis (PCA).

11. The system of claim 10, wherein the components evaluated by the PCA comprise the evaluation criteria from the evaluation criteria pool and one or more of:

statistical measures of the AI processes results;

measures of the absence of bias in the AI processes;

an index of trust of the training data of the AI processes; and the ad-hoc programs that return statistical or qualitative values about the AI processes.

12. The system of claim 11, wherein the statistical measures of the AI processes results comprise one or more of accuracy, precision, and recall.

13. The system of claim 11, wherein the stored instructions, when executed further configure the system to independently determine the statistical measures of the AI processes results by training the AI process with a subset of the training data and using the trained AI process to predict the remaining training data not part of the subset.

14. The system of claim 9, wherein the MTI database stores a plurality of MTIs generated at a plurality of different times for a plurality of different AI processes.

15. The system of claim 14, wherein the stored instructions, when executed further configure the system to generate a display of the plurality of MTIs for one of the plurality of different AI processes to provide an indication of a development of the MTI over time.

16. The system of claim 9, wherein the stored instructions, when executed further configure the system to generate a display of at least one MTI from each of two or more of the different AI processes to provide a relative measure of trustworthiness of the two or more different AI processes.

17. A non-transitory computer readable memory storing instructions, which when executed by a processing unit of a system configure the system to:

determine a plurality of evaluation criteria from a pool of evaluation criteria for use in generating a machine trust index (MTI) score for an artificial intelligence (AI) process, each of the evaluation criteria associated with an evaluation process to be used in evaluating the respective evaluation criteria;

evaluate each of the plurality of determined evaluation criteria according to the evaluation process associated with the respective evaluation criteria;

execute an MTI determination process to generate the MTI score based on the evaluated evaluation criteria;

storing in an MTI database the MTI score in association with a time the MTI score was generated;

receive feedback associated with trustworthiness of one or more AI process each associated with a respective MTI score and storing in the MTI database;

automatically apply a supervised or reinforcement learning algorithm to a plurality of generated MTI scores stored in the MTI database to determine which evaluation criteria in the pool of evaluation criteria are predictive of a particular feedback received about the plurality of AI processes;

automatically adjust the MTI determination process based on which evaluation criteria are predictive of the particular user feedback;

receive additional texts;

determine similarity matches between the additional texts and text of one or more evaluation criteria in the pool of evaluation criteria;

present matches to a user via a user interface;

receive an indication of whether to add a new evaluation criteria to the pool of evaluation criteria based on the presented matches and adding the new evaluation criteria to the pool of questions;

using a subset of generated MTIs stored in the MTI database, determine which evaluation criteria in the pool of evaluation criteria are significant in generating the MTI; and suggest possible enhancements for improving the results of the significant evaluation criteria.

\* \* \* \* \*